United States Patent [19]
Blonder et al.

[11] Patent Number: 6,036,327
[45] Date of Patent: *Mar. 14, 2000

[54] TRANSPARENT DISPLAY WITH DIFFUSER BACKED MICROTEXTURED ILLUMINATING DEVICE AND METHOD OF MANUFACTURE THEREFOR

[75] Inventors: Greg E. Blonder, Summit; Bertrand H. Johnson, Murray Hill; Yiu-Huen Wong, Summit, all of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/063,514

[22] Filed: Apr. 21, 1998

Related U.S. Application Data

[63] Continuation-in-part of application No. 08/901,384, Jul. 28, 1997, abandoned.

[51] Int. Cl.[7] .................................................. F21V 7/04
[52] U.S. Cl. ........................... 362/31; 362/330; 362/329; 362/800
[58] Field of Search ................................... 362/31, 23, 28, 362/29, 30, 300, 299, 298, 800, 327, 328, 329, 330, 331

[56] References Cited

U.S. PATENT DOCUMENTS

| | | |
|---|---|---|
| 3,994,564 | 11/1976 | Somogyi . |
| 4,373,282 | 2/1983 | Wragg ........................................ 40/546 |
| 5,390,436 | 2/1995 | Ashall ........................................ 362/31 |
| 5,485,291 | 1/1996 | Qiao et al. ................................. 362/31 |
| 5,521,796 | 5/1996 | Osakada et al. ........................... 362/31 |
| 5,664,862 | 9/1997 | Redmond et al. ......................... 362/31 |

FOREIGN PATENT DOCUMENTS

0 544 332 A1  6/1993  European Pat. Off. ...... G02F 1/1335

*Primary Examiner*—Thomas M. Sember

[57] ABSTRACT

The present invention provides a substantially planar illuminating device, a visual display having an internal light source and a method of manufacture therefor. The illuminating device includes a transparent substrate having a pair of substantially parallel major surfaces and an entry point for accepting light from the light source wherein the substrate functions as a guide for the light. The device also includes a plurality of microelements located on one of the pair of surfaces. The microelements have a substantially planar surface with an average roughness less than one micron and a side wall abnormal to the planar surface. In advantageous embodiments, the side wall is curved. The planar surface is configured to re-direct a substantial amount of light received in the substrate from an external light source out of the substrate. The side wall is configured to re-direct light from the internal light source out of the substrate.

40 Claims, 7 Drawing Sheets

TRANSPARENT DISPLAY WITH DIFFUSER BACKED MICROTEXTURED ILLUMINATING DEVICE AND METHOD OF MANUFACTURE THEREFOR

RELATED APPLICATION

This is a continuation-in-part of U.S. Ser. No. 08/901,384, filed on Jul. 28, 1997, entitled "TRANSPARENT DISPLAY WITH DIFFUSER-BACKED MICROTEXTURED ILLUMINATING DEVICE AND METHOD OF MANUFACTURE THEREFOR", now abandoned.

TECHNICAL FIELD OF THE INVENTION

The present invention is directed, in general, to illuminating devices and, more specifically, to an illuminating device useful for illuminating transparent displays, such as liquid crystal displays ("LCDs").

BACKGROUND OF THE INVENTION

The combination of microelectronic circuits and low power transparent displays, such as liquid crystal displays ("LCDs"), has led to a wide variety of portable electronic products. "Transparent displays," as used herein, refers to visual display devices wherein either the visual message portion of the display or the background portion of the display is transparent or translucent. These products range from electronic watches to hand-held television receivers and laptop computers. Low power consumption is a critical requirement for each of these products.

Despite their considerable utility in conjunction with integrated circuits, LCDs have a number of shortcomings. In typical LCDs, the activated portion (perhaps representing a visual message) is darkened and the inactivated portion (perhaps representing a background for the visual message) is lightened. One shortcoming of LCDs is that the contrast between the activated and inactivated portions is relatively low, making the LCD hard to read. The contrast can be increased by backlighting the LCD, thereby producing a sharp contrast between the portions of the LCD darkened by activation and the light shining through the transparent, inactive portions. Currently, electroluminescence ("EL") devices provide the highest spatial and angular backlighting uniformity. EL devices, however, require a special, relatively high-voltage inverter and suffer from a relatively short lifetime. All conventional backlighting arrangements, including EL devices, are inefficient. Even in so complex an electronic structure as a portable computer, the power used in backlighting is responsible for a major portion of total battery drain.

U.S. Pat. No. 5,245,454, issued on Sep. 14, 1993, to Blonder, entitled "LCD Display With Microtextured Back Reflector And Method For Making Same," commonly assigned with the present invention and incorporated herein by reference, discloses a microtextured reflector having dispersion characteristics of enhanced uniformity and a display device that can be read over an enhanced range of viewing angles. Specifically, a reflector comprises a base plane having a microtextured surface comprising a pattern of microelements having maximum lateral dimensions less than 125 microns and smooth, continuous, mold-formed surfaces arising from the base plane. A preferred reflecting surface is composed of closely-packed, smooth-surfaced spherical segments having diameters of 25 microns and altitudes of 4 microns.

U.S. Pat. No. 5,349,503, issued on Sep. 20, 1994, to Blonder, et al., entitled "Illuminated Transparent Display With Microtextured Back Reflector," commonly assigned with the present invention and incorporated herein by reference, discloses a particularly efficient illuminating device for a transparent display comprising a microtextured reflecting surface formed on a major surface of a transparent substrate and a light source for directing light into the transparent substrate approximately parallel to the major surface. Preferably, the substrate has two major surfaces separated by a thickness in the range of 0.5 mm to 2.0 mm so that the substrate behaves as a light guide. A substantial portion of the light passing into the substrate undergoes total internal reflection until it hits a microelement and is reflected out of the substrate. The result is an efficient illuminating device particularly useful for backlighting LCDs or other transparent displays.

Accordingly, what is needed in the art is an illuminating device for a transparent display that provides light of acceptable spatial and angular uniformity with minimal power consumption and a method of manufacture therefor.

SUMMARY OF THE INVENTION

To address the above-discussed deficiencies of the prior art, the present invention provides a substantially planar illuminating device, a visual display having an internal light source and a method of manufacture therefor. The illuminating device includes a transparent substrate having a pair of substantially parallel major surfaces and an entry point for accepting light from the light source wherein the substrate functions as a guide for the light. The device also includes a plurality of microelements located on one of the pair of surfaces. The microelements have a substantially planar surface with an average roughness less than one micron and a side wall abnormal to the planar surface, which in advantageous embodiments, is curved. The planar surface is configured to re-direct a substantial amount of light received in the substrate from an external light source out of the substrate. The side wall, on the other hand, is configured to re-direct light from the internal light source out of the substrate.

Due to the microelements unique configuration, the present invention, therefore, provides a device that can alternatively use the internal light within the device to illuminate the display or light from an external source, such as ambient sunlight or room light, to illuminate the display. Thus, there is optimization in its use in both dark and day time operations.

The substrate may be quartz, glass, plastic or any other relatively transparent material capable of being employed as a light guide and capable of being textured appropriately with the microelements.

In one embodiment of the present invention, the side wall has a side wall area that is a function of a distance of the microelement from the entry point to enhance a uniformity of the scattering of the light over an area of the pair of surfaces.

In one particularly advantageous embodiment, the roughness ranges from about 2.5 nm to about 0.50 nm. In yet another aspect of this particular embodiment, the roughness is 2.5 nm.

In another embodiment of the present invention, the microelements are substantially frustoconical indentations in the one of the pair of surfaces. Alternatively, the microelements may be substantially frustoconical protrusions. In a manner to be shown, frustoconical indentations are optimal in that they effectively scatter light produced by the light source without unduly scattering ambient light that may enter via the adjacent transparent display. Moreover, the unique configuration provides a microelement that can re-direct light from either an internal or external source.

In yet another embodiment, the device further comprises a layer of diffusing material located over one of the pair of surfaces. In a more preferred embodiment, the diffusing material is selected from the group consisting of: (1) a metallized polycrystalline diamond film, (2) a spun bonded olefin and (3) paper. It has been found that diffusing the light yields increased uniformity of light compared with reflecting (specular) the light. However, reflecting or absorbing light is within the broad scope of the present invention.

The device, in yet another embodiment further comprises a layer of reflective material over minor surfaces of the substrate to reflect the light within the substrate.

The light source may be a surface-emitting light emitting diode ("LED"). Other light sources, however, such as incandescent or fluorescent sources or EL devices are within the broad scope of the invention.

In a preferred embodiment of the present invention, the pair of major surfaces are spaced apart by a thickness of about 0.5 mm to about 2.0 mm. However, the broad scope of the present invention contemplates substrates of any thickness or lateral dimension.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
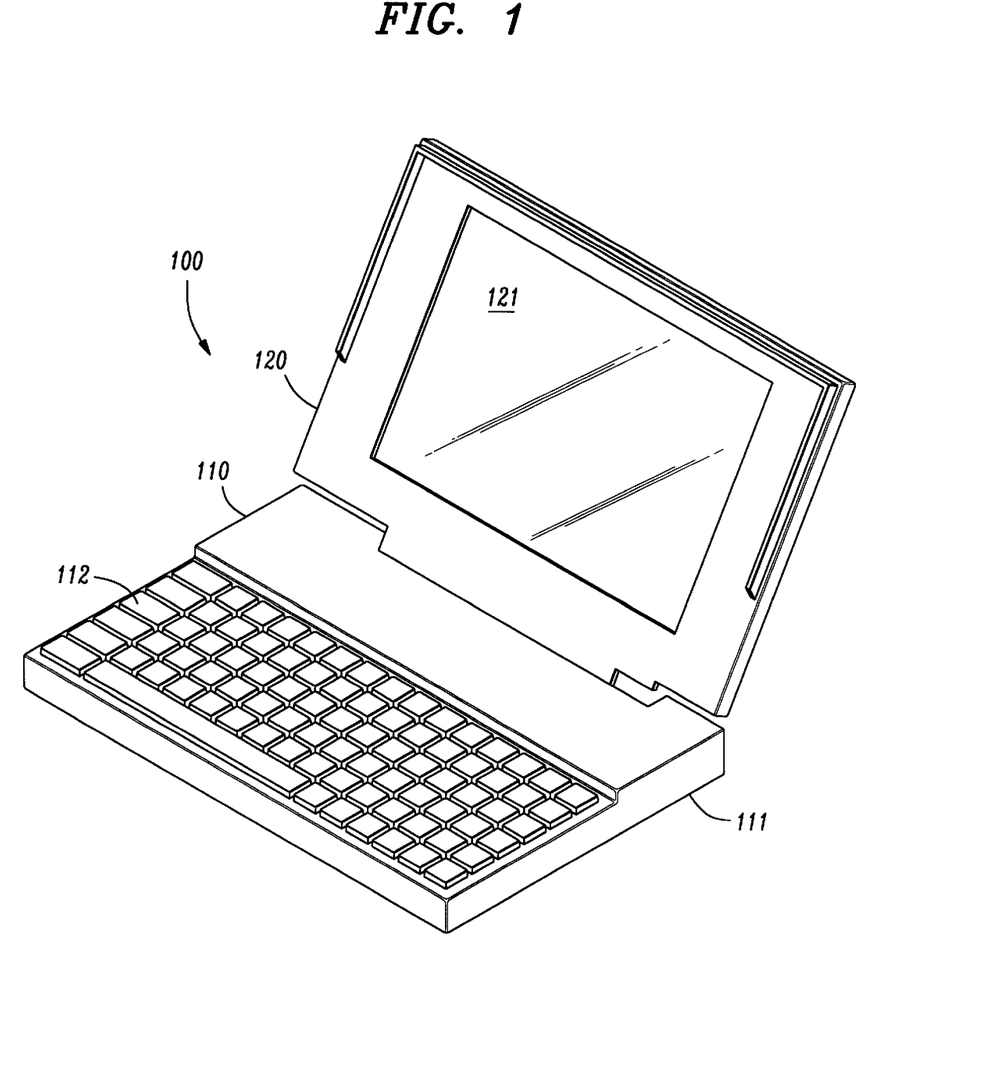
FIG. 1 illustrates an isometric view of a portable computer providing an environment in which the present invention operates.

Referring initially to FIG. 1, illustrated is an isometric view of a portable computer, generally designated 100, providing an environment in which the present invention operates. The portable computer 100 comprises a lower half 110 and an upper half 120. The lower half 110 comprises an outer shell or chassis 111 that contains various, compactly-arranged electronic components of the portable computer 100 and a keyboard 112 allowing a user to transmit information to the portable computer 100.

The upper half 120 contains a visual display or monitor 121 allowing the portable computer 100 to transmit information to the user. The visual display or monitor 121 preferably includes a transparent display device capable of conveying a visual message by varying a relative contrast of a visual message portion of the display device and a background portion of the display device. The illuminating device of the present invention is preferably located behind the display device and provides light for the display device at least under conditions of low or no ambient light. The portable computer 100 is presented for illustrative purposes only and other applications (for the illuminating device) including, without limitation, high efficiency large viewing angle sub-threshold lighting such as a nightlight, are well within the scope of the present invention.

The lower half 110 and the upper half 120 are hinged together so as to allow the lower half 110 and the upper half 120 to rotate relative to each other. This allows the portable computer 100 to assume a closed, storage position wherein the upper and lower halves 110, 120 shield the keyboard 112 and the monitor 121 from damage and wherein the portable computer 100 can be conveniently stored. The portable computer 100 can also assume (as shown) an open, operating position wherein the keyboard 112 and the monitor 121 are exposed to a user for communication therewith.

Figure 2:
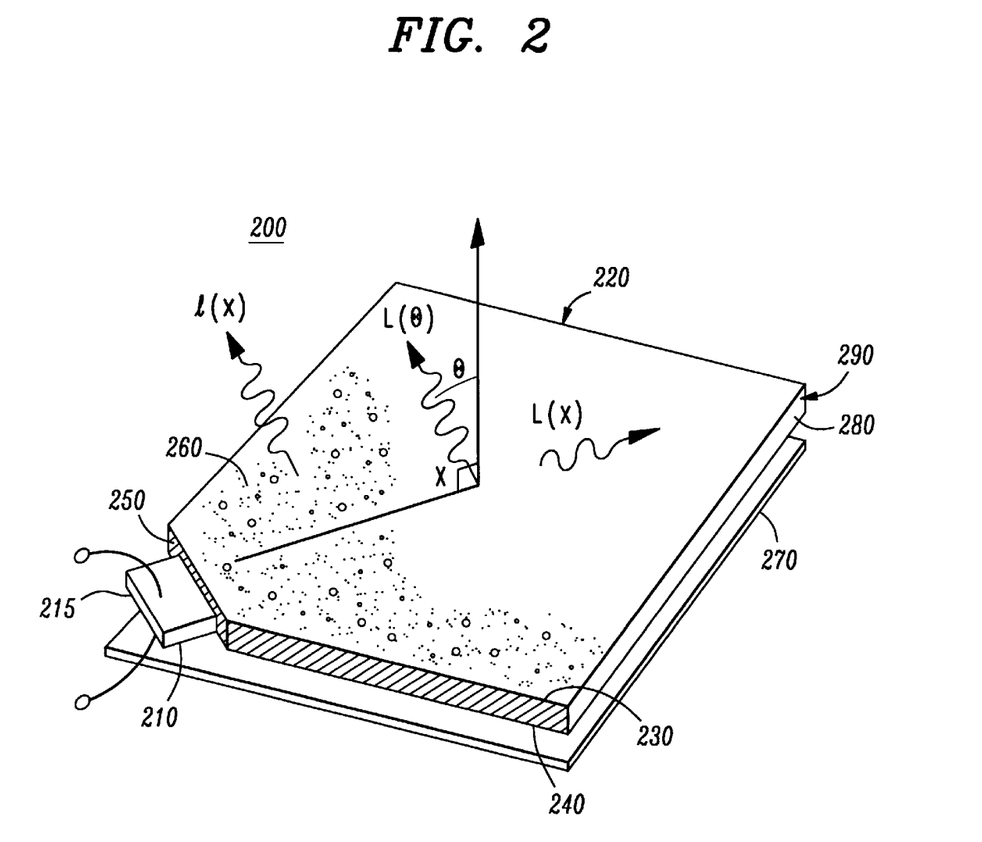
FIG. 2 illustrates an isometric view of an illuminating device constructed according to the principles of the present invention.

Turning now to FIG. 2, illustrated is an isometric view of an illuminating device 200 constructed according to the principles of the present invention. The illuminating device 200 includes a light source 210 such as a LED (e.g., an amber AlInGaP LED manufactured by Hewlett Packard) mounted in a corner 215. While the light source is demonstrated as a LED, other light sources, such as, without limitation, multicolor LEDs, incandescent sources, fluorescent sources or EL devices, are within the broad scope of the invention.

The illuminating device 200 also includes a transparent substrate 220 having a pair of substantially parallel major surfaces 230, 240 (spaced apart, for illustrative purposes only, by a thickness of about 0.5 mm to about 2.0 mm) and an entry point (generally designated 250) for accepting light from the light source 210. The substrate 220 functions as a guide for the light. The major surface 230 is textured with a plurality of microelements (collectively designated 260) for scattering the light from the substrate 220 to, ultimately, a display device (see FIG. 1). The major surface 230 may alternatively provide a modulated signal as a wireless communication link to a remotely located receiver and display device. The substrate 220 may be quartz, glass, plastic or any other relatively transparent material capable of being employed as a light guide and capable of being textured appropriately with the microelements 260. The microelements 260 comprise a side wall (see FIG. 3) having a side wall area; the side wall area is a function of a distance of the microelements 260 from the entry point 250 to enhance the uniformity of the scattering of the light over an area of the pair of surfaces 230, 240.

The present invention recognizes that illumination within the substrate 220 varies as a function of the distance from the light source 210 and compensates for that variation by decreasing the side wall area of the microelements 260 that are nearer the light source 210, and increasing the side wall area of the microelements 260 that are farther away from the light source 210. In effect, the side wall area determines the amount of light scattered by each microelement 260.

In the illustrated embodiment, the entry point 250 is located at the corner 215 of the substrate 220. It has been found that a corner of the substrate 220 is an optimal placement for the entry point 250. However, other entry point locations, including, without limitation, an imbedded light source in the substrate 220 to thereby isotropically illuminate the substrate 220 and illuminating device 200, are within the broad scope of the present invention.

The illuminating device 200 further includes a diffuser 270 comprising a layer of diffusing material located adjacent to the major surface 240 to reflect ambient light in a reflector mode of operation. The diffusing material is generally selected from a group consisting of a metallized polycrystalline diamond film, spun bonded olefin and paper. The diffuser 270 provides increased uniformity of light compared with reflecting the light. However, reflecting or absorbing light is also within the broad scope of the present invention.

In the illustrated embodiment, the illuminating device 200 still further comprises a layer of reflective material (designated 280) over the minor surfaces (collectively designated 290) of the substrate 220 to reflect the light within the substrate 220 thereby further improving the uniformity around the minor edges 290 of the illuminating device 200. However, for effectiveness, the internal reflection properties of the substrate can be used to provide the necessary reflective operation of the device.

The illuminating device 200 is, therefore, capable of operating in two separate modes of operation. In a passive, lighting ambient application or reflector mode of operation, a maximum transparency may be achieved by minimizing scattering through the substrate 220. Conversely, in an active, back illumination mode of operation, a maximum scattering of the photons throughout the substrate 220 improves contrast viewing. To optimize the two modes of operation, it is desirable to maximize the flat area in the substrate 220 (to facilitate transparency) for the reflector mode of operation, and to maximize right angle scattering from the light source 260 for the back illumination mode of operation. The present invention takes into account the above referenced criteria and therein provides an illuminating device that facilitates optimal viewing efficiency in either mode of operation.

A representative method of manufacturing the illuminating device 200 will hereinafter be described. First, an entry point 250 is formed on the corner 215 of the substrate 220 and the light source 210 is coupled thereto; the entry point 250 is capable of accepting light from the light source 210 and the substrate 220 functions as a guide for the light. Second, the major surface 230 is etched with the microelements 260 (e.g., frustoconical indentations) for scattering the light from the substrate 220 (see the description associated with FIGS. 9A, 9B for an explanation of representative methods of manufacturing the substrate 220 and microelements 260 etched thereon). Again, the microelements 260 have a side wall with a side wall area; the side wall area being a function of a distance of the microelements from the entry point 250 to enhance a uniformity of the scattering of the light over an area of the major surfaces 230, 240. Third, the layer of reflective material 280 may be formed over the minor surfaces 290 of the substrate 220 to reflect the light within the substrate 220 thereby further improving the uniformity around the minor surfaces 290 of the illuminating device 200. For instance, the minor surfaces 290 of the substrate 220 may be flame polished, and as an alternative, metallized with aluminum. Finally, the diffuser 270 is located adjacent the major surface 240.

The illustrated embodiment also demonstrates a surface luminance [designated l(x)] and an in-plane luminance [designated L(x)] as a function of a distance "x" from the light source 210. The illustrated embodiment further demonstrates a viewing angle "θ" and a viewing angle luminance [designated L(θ)]. The illustrated embodiment, therefore, demonstrates that the substrate 220 acts as light guide and the microelements scatter the light to achieve uniform luminance at a wide array of viewing angles.

Figure 3:
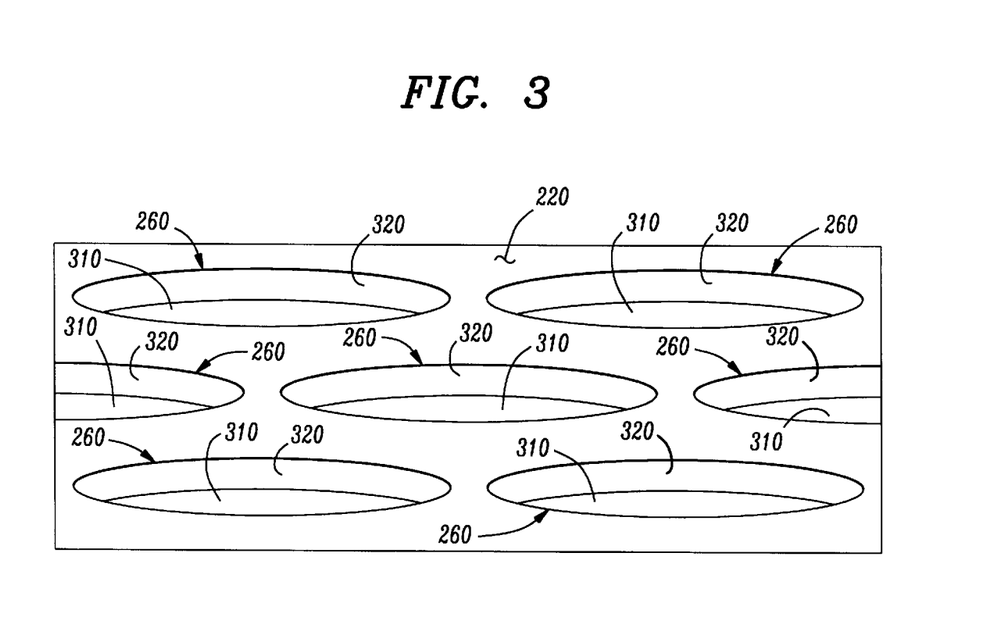
FIG. 3 illustrates an isometric view of a substantially frustoconical microelement with a side wall area wherein the microelement is an indentation.

Turning now to FIG. 3, illustrated is an isometric view of a substantially frustoconical microelement 260 with a substantially planar surface 310 and a side wall area 320. As used herein, substantially planar surface means that the surface area of the microelement's planar surface 310, as defined by the microelement's side wall 320, lies substantially within the same plane. In other words, the substantially planar surface 310 is a substantially, continuously flat surface from the point where the plane of the side wall intersects the plane of the planar surface 310 and across the planar surface's 310 area as defined by the side wall 320. The minor exception is, of course, normal surface irregularities that may be present at submicron levels.

In the particular embodiment illustrated in FIG. 3, the microelements 260 are indentations. The substantially planar surface 310 has an average roughness (RA) less than about one micron and is configured to re-direct a substantial amount of light, which is transmitted into the substrate 220 from an external light source (not shown), out of the substrate 220; that is, enough of the external light is transmitted out of the substrate 220 by the planar surface 310 to illuminate the display such that it can be read without the need of an additional light source. Thus, if so desired, the internal light source 210 may be turned off when there is sufficient ambient light present. In such instances, external light goes through the display and the background substrate 220, and it is then re-directed off the substantially planar surface 310 and out of the substrate 220. It is desirable to have the maximum transmission in the substrate 220, because any additional scattering in the substrate 220 would degrade the signal to the viewer. Maximum transmission is enhanced by the degree of smoothness of the planar surface 310. A smoother surface allows more light to be re-directed from the substrate 220. Thus, in an advantageous embodiment, the roughness ranges from about 2.5 nm to about 0.50 nm, and more preferably is about 2.5 nm.

The microelements 260 are located on the major surface 230 of the substrate 220. As previously mentioned, the microelements 260 comprise a side wall 320 having a side wall area, which is a function of a distance of the microelements 260 from the entry point (see FIG. 2) to enhance a uniformity of the scattering of the light over an area of the substrate 220. Thus, the illumination within the substrate 220 varies as a function of the distance from the light source (see FIG. 2) and compensates for that variation by decreasing the side wall area of the microelements 260 that are nearer the light source, and increasing the side wall area of the microelements 260 that are farther away from the light source.

Figure 4A:
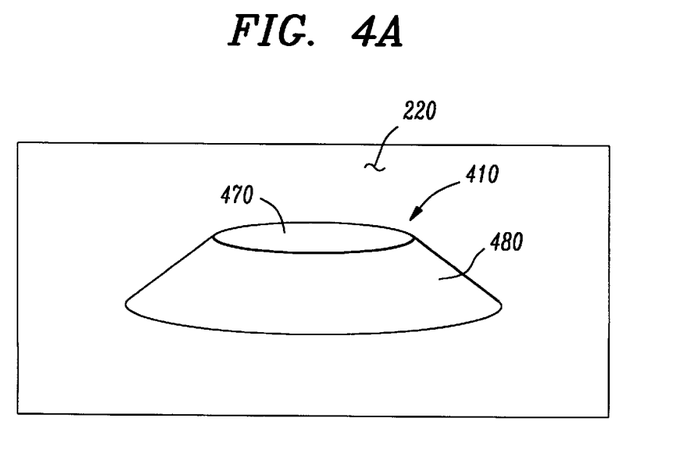
FIGS. 4A and 4B illustrate isometric views of substantially frustoconical microelements with a side wall area wherein the microelement is a protrusion.
Figure 4B:
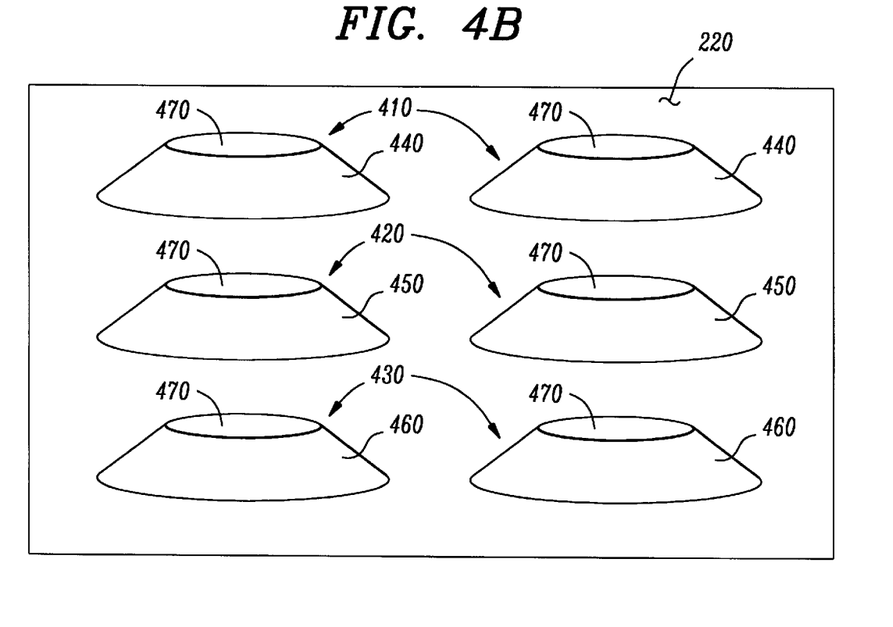

Turning now to FIGS. 4A and 4B, illustrated are isometric views of substantially frustoconical microelements with a side wall area wherein the microelements are protrusions 410, 420, 430 having side walls 440, 450, 460, respectively, with varying side wall areas. The substantially frustoconical protrusions 410, 420, 430 function as microelements in the surfaces of the substrate 220 as discussed with respect to FIGS. 2 and 3. The frustoconical protrusions 410, 420, 430 are optimal in that they effectively scatter light produced by a light source without unduly scattering off ambient light that may enter through the transparent part of the display (see FIGS. 1 and 2). Again, the side wall area is smaller for the frustoconical protrusions 410, 420, 430 that are nearer a light source, and the side wall area is larger for the frustoconical protrusions 410, 420, 430 that are farther away from the light source. These microelements, of course, include the planar surface 470 and side walls 480, which serve the same purpose as described above with respect to FIG. 3.

The smoothness of these microelements is achieved by silicon etching processes. The process sequence starts out with a typical lithographic step that defines the pattern. The substrates are then subjected to either a chemical (wet etching) or a plasma (dry etching) using photoresist as a protecting layer to delineate the features. For example, a buffered oxide etch (BOE), which is a mixture of hydrofluoric acid and ammonia fluoride, can be used for wet etching the microelements on the display background. In one embodiment, the etching rate is 10.0 nm/minute for a 7:1 solution. For faster etching, more concentrated versions can be used. If other glass materials are used, the etchant can be modified by adding other acids. For dry etching (e.g., plasma or reactive ion etching), a fluorine containing plasma is used. Again depending on the parameters, the etching rate can be modified. For example, at 100 milliTorr and 50 sccm with carbon tetra fluoride ($CF_4$) or carbon trifluoride ($CHF_3$), the same rate as used in the wet etching may be obtained for the plasma etch. The control of uniformity and thickness etched are built into the equipment used. With more state of the art equipment, the etching processes can be improved. Those who are skilled in the art can readily determine the smoothness of the surface. After the microelements are etched, the photoresist is subsequently removed, which reveals the desired patterns and features.

Figure 5:
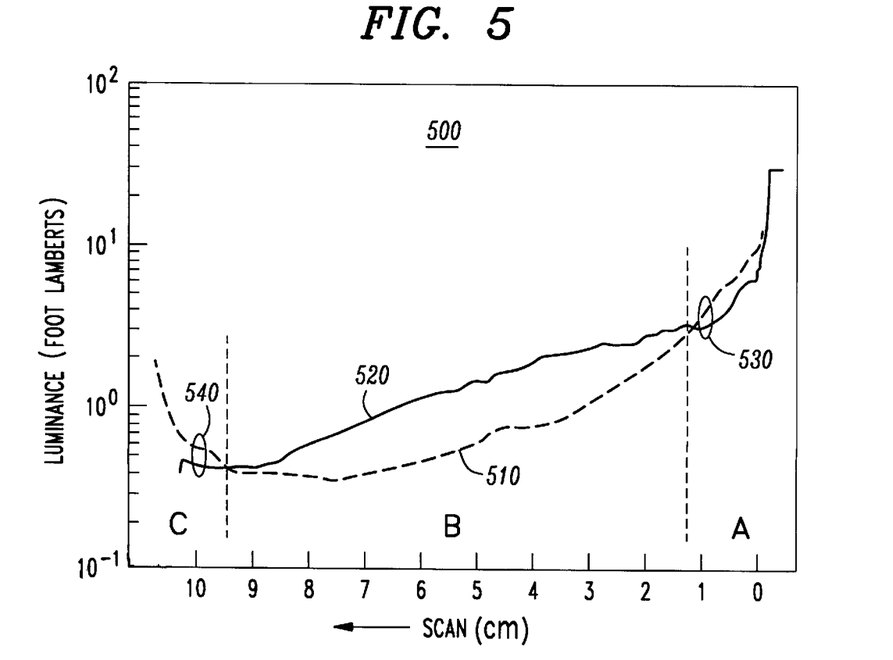
FIG. 5 illustrates a plot of surface luminance as a function of light source distance for microelements of uniform and nonuniform depths.

Turning now to FIG. 5, illustrated is a plot 500 of surface luminance l(x) as a function of light source distance for microelements of uniform depth (designated by dotted line 510) and microelements of nonuniform depth (designated by solid line 520). A substrate employing microelements of uniform depth pertains to a condition where the microelements are textured at a uniform depth within the substrate forming an illuminating device. A substrate employing microelements of nonuniform depth pertains to a condition where the microelements are textured at varying depths within the substrate forming an illuminating device. The plot 500 illustrates the surface luminance l(x) of an illuminating device analogous to the illuminating device described with respect to FIG. 2.

In short, the illuminating device includes a light source mounted in a corner of a transparent substrate having a pair of substantially parallel major surfaces spaced apart by a thickness of about 1.7 mm. The substrate functions as a guide for the light. A major surface of the substrate is textured with a plurality of microelements at uniform and nonuniform depths. The entry point for the light is located at the corner (via the light source) of the substrate. The illuminating device further includes a diffuser comprising a layer of white tyvek paper located over a major surface to reflect ambient light in a reflector mode of operation.

The plot 500 demonstrates that for both the microelements at the uniform and nonuniform depths 510, 520 about a ten-fold reduction in surface luminance l(x) occurs from the source end A (i.e., light source end) to the far end C of the illuminating device. Generally, the distance between the source end A and the far end C is about 10 cm. The luminance, therefore, drops by approximately a factor of 2 for every 2 cms farther away from the source end A. Additionally, the plot 500 demonstrates that the microelements of nonuniform depth 520 realize an improved luminance l(x) over the microelements of uniform depth 510 over the entire range of distance from the source to far end A, C of the illuminating device with the largest disparity revealed at about 5 –5.5 cm from the source end at a point B. Finally, the plot 500 displays higher intensity light at the edges (designated 530, 540) of the illuminating device. The light at either end is attributed to stray light 530 from the source end A and leakage light 540 at the far end C. However, the stray and leakage light 530, 540 may be shielded by adding flame polished and metallized aluminum edges or minor surfaces about the pair major surfaces of the substrate to form a frame housing about the substrate thereby creating a less distracting background for the illuminating device.

Figure 6:
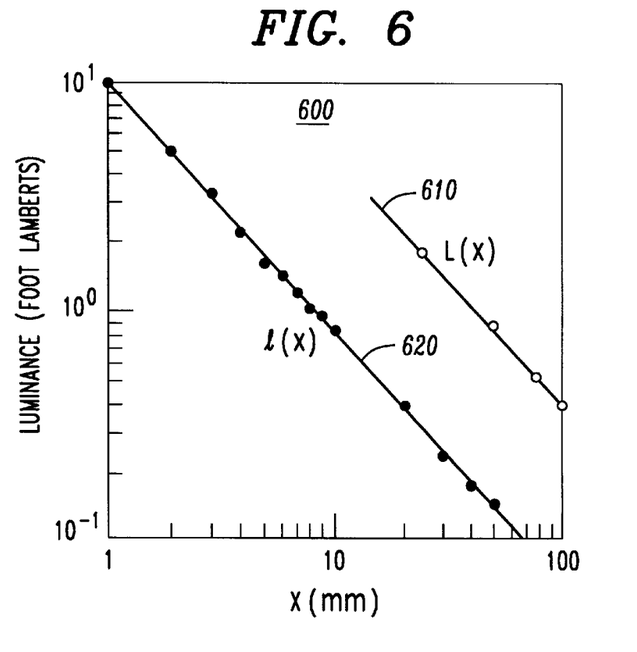
FIG. 6 illustrates a log-log plot of in-plane luminance and surface luminance as a function of light source distance.

Turning now to FIG. 6, illustrated is a log-log plot 600 of in-plane luminance L(x) (designated by line 610) and surface luminance l(x) (designated by line 620) as a function of light source distance. The log-log plot 600 illustrates the in-plane luminance L(x) and surface luminance l(x) of an illuminating device analogous to the illuminating device described with respect to FIG. 2. Again, the illuminating device includes a light source mounted in a corner of a transparent substrate having a pair of substantially parallel major surfaces spaced apart by a thickness of about 1.7 mm. The substrate functions as a guide for the light. A major surface of the substrate is textured with a plurality of microelements of uniform and nonuniform depth. The entry point for the light is located at the corner (via the light source) of the substrate. The illuminating device further includes a diffuser comprising a layer of white tyvek paper located over a major surface to reflect ambient light in a reflector mode of operation.

The log-log plot 600 demonstrates that, for both the in-plane luminance L(x) 610 and surface luminance l(x) 620, the luminance may be approximated by a 1/x dependence, where x corresponds to a distance from a source end (i.e., light source end) of the illuminating device. Generally, the distance between the source end and a far end of the illuminating device is about 100 mm. As previously mentioned, there is about a two order of magnitude reduction in luminance from the source to far end of the illuminating device.

The log-log plot 600 also illustrates that about 15% of the light (i.e., l(x)/L(x)=.20) is redirected thereby suggesting that the illuminating device is more efficient as a light guide than as a reflector of ambient light. A deeper or larger cross-sectional and faster textured microelement may therein improve the efficiency of the reflector. The relationship of luminance to distance away from the light source (denoted by 1/x) suggests that to compensate for the non-uniformity of the illuminating device brightness a surface cross-sectional area of the microelements should vary linearly as the distance from the light source varies. It is important to note that the ambient light considerations are significant because in the reflector mode of operation the ambient light passes through the substrate to the diffuser and, then, reflects back through the substrate to a viewer. A high transparency illuminating device provides a higher display contrast during the reflector mode (ambient) of operation analogous to the back illumination mode of operation. By partitioning the functions of the light guide and reflector between the substrate and diffuser the performance of the illuminating device in either mode of operation is vastly improved.

Figure 7:
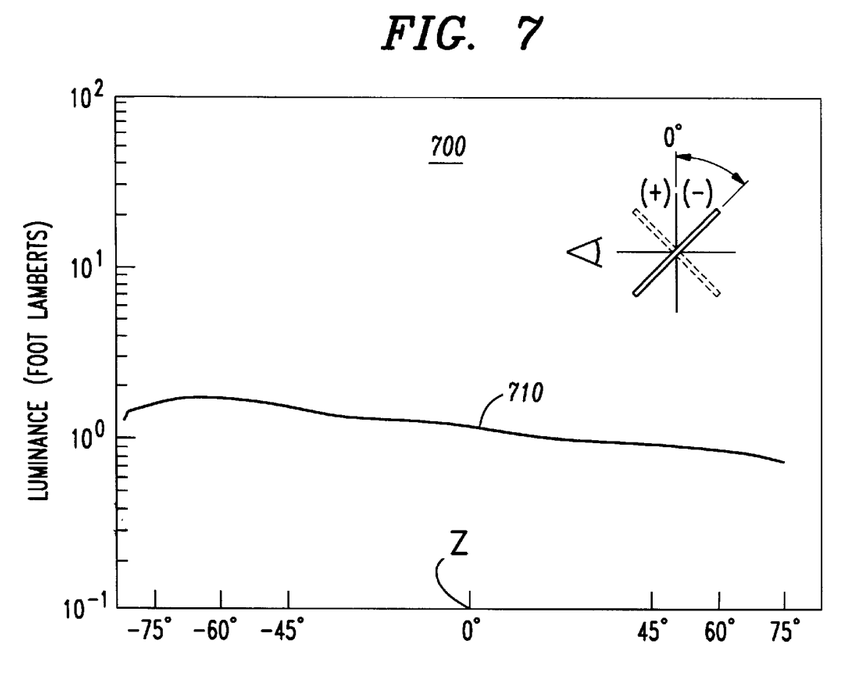
FIG. 7 illustrates a plot of luminance as a function of viewing angle.

Turning now to FIG. 7, illustrated is a plot 700 of luminance l(x) (designated as line 710) as a function of viewing angle (denoted by θ). The viewing angle θ is simply the angle a viewer is observing a display employing an illuminating device according to the principles of the present invention. Once again, the illuminating device includes a light source mounted in a corner of a transparent substrate having a pair of substantially parallel major surfaces spaced apart by a thickness of about 1.7 mm. The substrate functions as a guide for the light. A major surface of the substrate is textured with a plurality of microelements of uniform or nonuniform depth. The entry point for the light is located at the corner (via the light source) of the substrate. The illuminating device further includes a diffuser comprising a layer of white tyvek paper located over a major surface to reflect ambient light in a reflector mode of operation. The plot 700 illustrates a plurality of viewing angles θ, for instance, at a point Z the viewer is observing the display at 0° or basically straight on center. The plot 700 demonstrates that, in accordance with the principles of the present invention, the luminance l(x) over a broad viewing angle θ remains relatively equal thereby providing a significant improvement over prior art illuminating devices.

Figure 8:
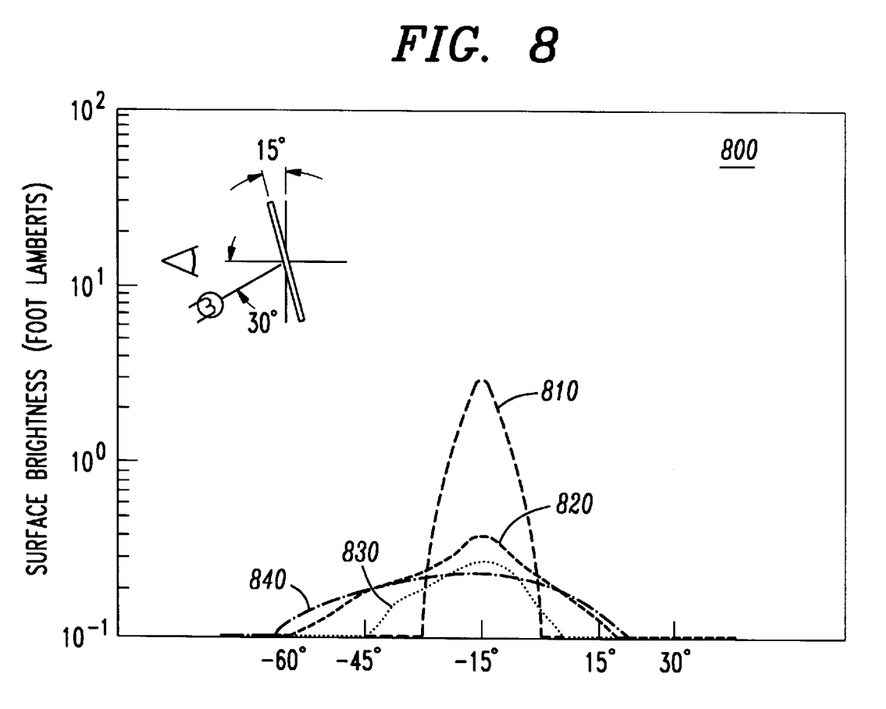
FIG. 8 illustrates a plot of reflection brightness as a function of diffuser material.

Turning now to FIG. 8, illustrated is a plot 800 of reflection brightness as a function of diffuser material. As previously mentioned, the diffuser is located over a major surface of a substrate to reflect ambient light when an illuminating device is operating in a reflector mode of operation. The reflection brightness is demonstrated for a plurality of commercially available materials including background material for a conventional wrist-watch 810, tyvek paper 820, metallized poly-crystalline diamond film 830 and white note paper 840. The plot 800 demonstrates a broad band of reflection brightness is attainable depending on the designated diffuser material. The above referenced materials are presented for illustrative purposes only and other reflective materials capable of functioning as a diffuser are within the broad scope of the invention.

Figure 9A:
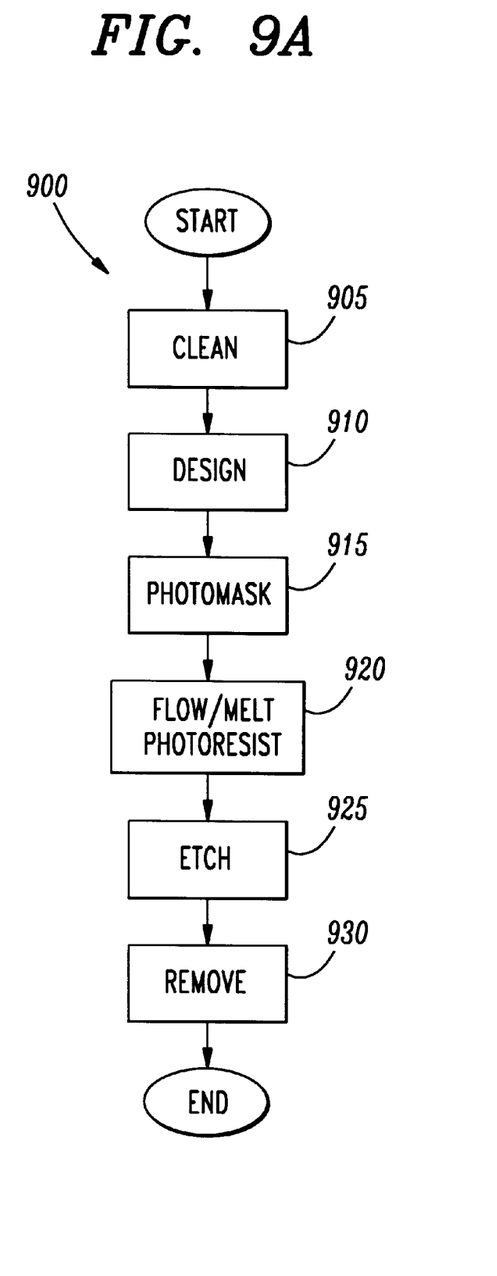
FIGS. 9A and 9B illustrate flow diagrams of representative methods of manufacturing a substrate for a microtextured illuminating device of the present invention.
Figure 9B:
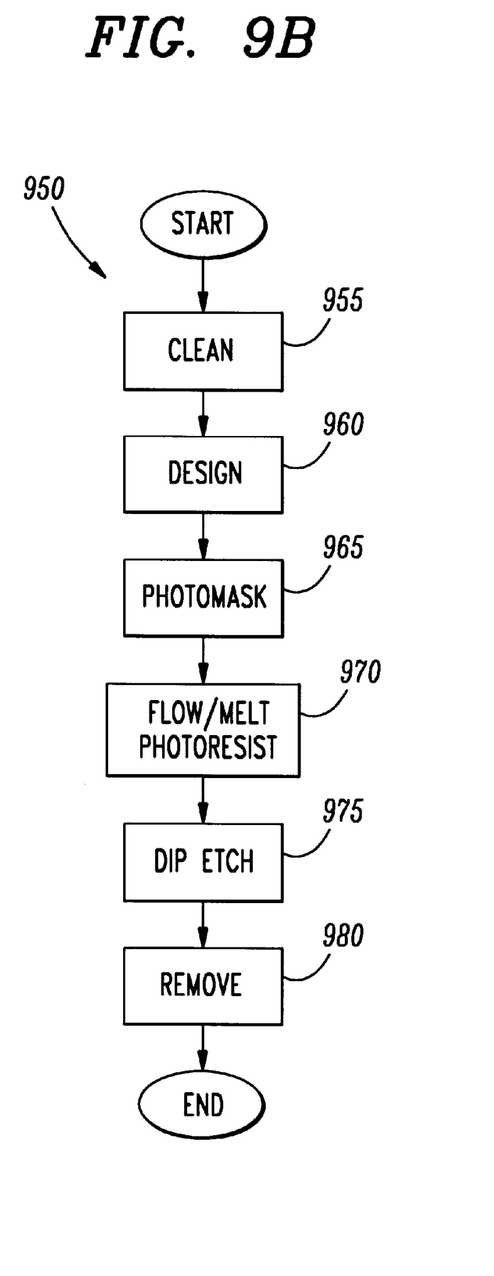

Turning now to FIGS. 9A and 9B, illustrated are flow diagrams of representative methods of manufacturing a substrate for a microtextured illuminating device of the present invention. Beginning with FIG. 9A, demonstrated is a processing sequence 900 for the formation of a substrate miniscus. The process 900 commences by a Piranha-Clean ("P-Clean") of a wafer or substrate, such as, without limitation, a quartz wafer, in a clean step 905. Next, the substrate undergoes a photolithography process generally comprising the following steps. First, a photomask is designed encompassing a design for each layer of the substrate in a design step 910. Second, the substrate is coated with a light sensitive film that hardens when exposed to light shining through the photomask in a photomask step 915. Third, the substrate is exposed to a chemical bath in a flow/melt photoresist step 920. Fourth, the substrate undergoes a reactive ion etching process whereby microelements are etched into the substrate in an etching step 925. Finally, the photomask is removed in a remove step 930 and a formed substrate miniscus is created.

The shape of the microelements is a function of the viscosity and aspect ratio (i.e., thickness/feature size) of the developed photoresist patterns in the photomask and the miniscus is formed by melting the photoresist pattern into the substrate. The shape of the microelements may be flattened by, for instance, terminating the etching process before the full photoresist pattern is consumed. Additionally, the side wall profile of the microelements may be varied by adjusting the selectivity of the etching process.

Turning now to FIG. 9B, demonstrated is a process sequence 950 for generating a nonuniform profile in the substrate miniscus. The process 950 commences, again, by a Piranha-Clean ("P-Clean") of the wafer or substrate, such as, without limitation, a quartz wafer, in a clean step 955. Next, the substrate undergoes a photolithography process generally comprising the following steps. First, a photomask is designed encompassing a design for each layer of the substrate in a design step 960. Second, the substrate is coated with a light sensitive film that hardens when exposed to light shining through the photomask in a photomask step 965. Third, the substrate is exposed to a chemical bath in a flow/melt photoresist step 970. Fourth, the substrate is dipped into a buffered oxide etching ("BOE") solution under controlled conditions whereby microelements are etched, at nonuniform depths, into the substrate in a dip etching step 975. Finally, the photomask is removed in a remove step 980 and a formed substrate miniscus is created.

The gradient may be programmed into the process 950 for specific designs and analogous methods may be employed in the reactive ion etching step 925 of the process 900 previously introduced. The features of the microelements may be varied in the process 950 by, for instance, locating opaque features on the photomask thereby resulting in a flat-top scattering center and linear side wall microelement. If a reverse tone feature (i.e., holes in the photomask) is employed, crater-like microelements, having a flat bottom and cylindrical side wall, result in a process similar in nature to isotropic etching. In general, the wet chemical etching is a more efficient process and requires less equipment thereby providing higher through-put at lower cost.

The above referenced processes 900, 950 can serve as the basis for preparing a master template by electroforming. The master template may then be employed to fabricate plastic piece parts either by molding or by embossing plastic sheets in rolls with the desired features. Additionally, a substrate may be employed without flame polishing and without metalizing the surfaces, including both the major and minor surfaces (see FIG. 2), by optimizing the scattering center design of the microelements as described above. Significant cost reductions are available by providing an illuminating device without smoothing out or metalizing the minor surfaces or plastic piece parts during production. Therefore, the present invention provides an illuminating device that optimizes performance and reliability and at the same time reduces power consumption and manufacturing costs.

Although the present invention has been described in detail, those skilled in the art should understand that they can make various changes, substitutions and alterations herein without departing from the spirit and scope of the invention in its broadest form.

What is claimed is:

1. A substantially planar illuminating device having an internal light source, comprising:
    a transparent substrate having a pair of substantially parallel major surfaces and an entry point for accepting light from said internal light source, said substrate functioning as a guide for light from said internal light source; and a plurality of microelements located on one of said pair of surfaces, each of said microelements having a continuous, substantially planar surface with a perimeter and an average roughness less than one micron and a side wall that intersects said planar surface at said perimeter and at an angle that is abnormal to said planar surface, said planar surface configured to re-direct a substantial amount of light received in said substrate from an external light source out of said substrate and said side wall configured to re-direct light from said internal light source out of said substrate.

2. The device of claim 1 wherein said side wall has a side wall area being a function of a distance of said microelements from said entry point to enhance a uniformity of said scattering of said light over an area of said pair of surfaces.

3. The device as recited in claim 1 wherein said roughness ranges from about 2.5 nm to about 0.50 nm.

4. The device as recited in claim 3 wherein said roughness is about 2.5 nm.

5. The device as recited in claim 1 wherein said microelements are substantially frustoconical indentations in said one of said pair of surfaces.

6. The device as recited in claim 1 wherein said microelements are substantially frustoconical protrusions on said one of said pair of surfaces.

7. The device as recited in claim 1 further comprising a layer of diffusing material located over said one of said pair of surfaces.

8. The device as recited in claim 7 wherein said diffusing material is selected from the group consisting of:
a metallized polycrystalline diamond film,
a spun bonded olefin, and
paper.

9. The device as recited in claim 1 further comprising a layer of reflective material over minor surfaces of said substrate to reflect said light within said substrate.

10. The device as recited in claim 1 wherein said internal light source is a surface-emitting light emitting diode (LED).

11. The device as recited in claim 1 wherein said external light source is ambient light.

12. The device as recited in claim 1 wherein said side wall is curved.

13. The device as recited in claim 1 wherein said pair of major surfaces are spaced apart by a thickness of about 0.5 mm to about 2.0 mm.

14. A method of manufacturing a substantially planar illuminating device having an internal light source, comprising the steps of:
forming an entry point on a transparent substrate having a pair of substantially parallel major surfaces, said entry point capable of accepting light from said internal light source, said substrate functioning as a guide for said light; and
etching one of said pair of surfaces with a plurality of microelements for scattering said light from said substrate, each of said microelements having a continuous, substantially planar surface with a perimeter and an average roughness less than one micron and a side wall that intersects said planar surface at said perimeter and at an angle that is abnormal to said planar surface, said planar surface configured to re-direct a substantial amount of light received in said substrate from an external light source out of said substrate and said side wall configured to re-direct light from said internal light source out of said substrate.

15. The method as recited in claim 14 wherein said step of etching includes the step of etching a side wall having a side wall area thereof being a function of a distance of said microelements from said entry point to enhance a uniformity of said scattering of said light over an area of said pair of surfaces.

16. The method as recited in claim 14 wherein said step of etching includes etching said substantially planar surface such that it has a roughness ranging from about 2.5 nm to about 0.50 nm.

17. The method as recited in claim 16 wherein said roughness is about 2.5 nm.

18. The method as recited in claim 14 wherein said step of etching comprises the step of forming substantially frustoconical indentations in said one of said pair of surfaces.

19. The method as recited in claim 14 wherein said step of etching comprises the step of forming substantially frustoconical protrusion on said one of said pair of surfaces.

20. The method as recited in claim 14 further comprising the step of locating a layer of diffusing material over said one of said pair of surfaces.

21. The method as recited in claim 20 wherein said diffusing material is selected from the group consisting of:
a metallized polycrystalline diamond film,
a spun bonded olefin, and
paper.

22. The method as recited in claim 14 further comprising the step of forming a layer of reflective material over minor surfaces of said substrate to reflect said light within said substrate.

23. The method as recited in claim 14 further comprising the step of coupling a surface-emitting light emitting diode (LED) to said entry point.

24. The method as recited in claim 14 wherein said step of forming comprises the step of providing a substrate wherein said pair of major surfaces are spaced apart by a thickness of about 0.5 mm to about 2.0 mm.

25. A substantially planar display device having an internal light source and readable by said internal light source or by a light source external to said display device, comprising:
a transparent substrate having a pair of substantially parallel major surfaces and an entry point for accepting light from said internal light source, said substrate functioning as a guide for light from said internal light source; and
a plurality of microelements located on one of said pair of surfaces, each of said microelements having a continuous, substantially flat surface with a perimeter and an average roughness less than about 250 angstroms and a side wall that intersects said substantially flat surface at said perimeter and at an angle that is abnormal to said substantially flat surface, said substantially flat surface configured to reflect light from said external light source and said side wall configured to re-direct light from said internal light source out of said substrate.

26. The device of claim 25 wherein said side wall has a side wall area being a function of a distance of said microelements from said entry point to enhance a uniformity of said scattering of said light over an area of said pair of surfaces.

27. The device as recited in claim 25 wherein said roughness ranges from about 2.5 nm to about 0.50 nm.

28. The device as recited in claim 27 wherein said roughness is about 2.5 nm.

29. The device as recited in claim 25 wherein said microelements are substantially frustoconical protrusions on said one of said pair of surfaces.

30. The device as recited in claim 25 wherein said side wall is curved.

31. A visual display, comprising:
   a substantially planar transparent display device for conveying a visual message by varying a relative contrast of a visual message portion of said display device and a background portion of said display device;
   a substantially planar illuminating device aligned with said visual display device to provide light thereto, said illuminating device including:
      an internal light source;
      a transparent substrate having a pair of substantially parallel major surfaces and an entry point, located at a corner of said substrate, for accepting light from said light source, said substrate functioning as a guide for said light, one of said pair of surfaces textured with a plurality of frustoconical microelements, said frustoconical microelements located on one of said pair of surfaces and having a substantially planar surface with an average roughness less than one micron and a side wall abnormal to said planar surface, said planar surface configured to re-direct a substantial amount of light received in said substrate from an external light source out of said substrate and said side wall configured to re-direct light from said internal light source out of said substrate;
   a layer of reflective material over minor surfaces of said substrate to reflect said light within said substrate; and
   a layer of diffusing material located over said one of said pair of surfaces.

32. The device of claim 31 wherein said side wall has a side wall area being a function of a distance of said microelements from said entry point to enhance a uniformity of said scattering of said light over an area of said pair of surfaces.

33. The device as recited in claim 31 wherein said roughness ranges from about 2.5 nm to about 0.50 nm.

34. The device as recited in claim 33 wherein said roughness is about 2.5 nm.

35. The device as recited in claim 31 wherein said frustoconical microelements are substantially frustoconical indentations in said one of said pair of surfaces.

36. The device as recited in claim 31 wherein said frustoconical microelements are substantially frustoconical protrusions on said one of said pair of surfaces.

37. The device as recited in claim 31 wherein said internal light source is a surface-emitting light emitting diode (LED).

38. The device as recited in claim 31 wherein said external light source is ambient light.

39. The device as recited in claim 31 wherein said side wall is curved.

40. The device as recited in claim 31 wherein said pair of major surfaces are spaced apart by a thickness of about 0.5 mm to about 2.0 mm.

* * * * *